US011452009B2

(12) United States Patent
Sivavakeesar et al.

(10) Patent No.: US 11,452,009 B2
(45) Date of Patent: Sep. 20, 2022

(54) COMMUNICATION SYSTEM

(71) Applicant: NEC Corporation, Tokyo (JP)

(72) Inventors: Sivapathalingham Sivavakeesar, Milton Keynes (GB); Neeraj Gupta, London (GB)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/023,177

(22) PCT Filed: Sep. 22, 2014

(86) PCT No.: PCT/JP2014/075768
§ 371 (c)(1),
(2) Date: Mar. 18, 2016

(87) PCT Pub. No.: WO2015/046479
PCT Pub. Date: Apr. 2, 2015

(65) Prior Publication Data
US 2016/0227449 A1 Aug. 4, 2016

(30) Foreign Application Priority Data

Sep. 27, 2013 (GB) ...................................... 1317221

(51) Int. Cl.
*H04W 36/00* (2009.01)
*H04W 88/16* (2009.01)
*H04W 84/04* (2009.01)

(52) U.S. Cl.
CPC ... *H04W 36/0061* (2013.01); *H04W 36/0077* (2013.01); *H04W 88/16* (2013.01); *H04W 84/045* (2013.01)

(58) Field of Classification Search
CPC ............. H04W 88/16; H04W 36/0077; H04W 36/0061; H04W 84/045
See application file for complete search history.

(56) References Cited

U.S. PATENT DOCUMENTS 8,982,741 B2* 3/2015 Sirotkin .................. H04W 4/70
370/280
2011/0274030 A1 11/2011 Wang et al.
(Continued)

FOREIGN PATENT DOCUMENTS

GB 2512656 A 10/2014
JP 2009-060156 A 3/2009

OTHER PUBLICATIONS

Ericsson: "X2 Setup through an X2-GW", 3GPP Draft; R3-130258, 3rd Generation Partnership Project (3GPP), Mobile Competence Centre ; 650, Route Des Lucioles ; F-06921 Sophia-Antipolis Cedex ; France, vol. RAN WG3, No. Malta; Jan. 28, 2013-Feb. 1, 2013, Jan. 19, 2013 (Jan. 19, 2013), XP050671073.*

(Continued)

*Primary Examiner* — Kevin C. Harper
*Assistant Examiner* — Henry Baron
(74) *Attorney, Agent, or Firm* — Sughrue Mion, PLLC

(57) ABSTRACT

A communication system is disclosed comprising a gateway and a number of base stations communicating, via the gateway, in accordance with a base station to base station application protocol. The gateway receives a message from a first base station, destined for a second base station. The message comprises (a) information for the second base station, in a first part of the message; and (b) an identifier of the second base station, in a second part of the message other than the first part. The gateway can obtain from the received message the second base station's identifier without the gateway being required to obtain the information from the first part of the message. The gateway routes the message to the second base station identified by the obtained identifier.

4 Claims, 8 Drawing Sheets

(56) References Cited

U.S. PATENT DOCUMENTS

2013/0051316 A1 2/2013 Bhatt et al.
2014/0321447 A1* 10/2014 Ozturk .................. H04W 60/00
                                                           370/338
2015/0208289 A1* 7/2015 Xu ........................ H04W 76/11
                                                           370/331

OTHER PUBLICATIONS

3GPP TR 37.803 "3rd Generation Partnership Project; Technical Specification Group Radio Access Network; Universal Mobile Telecommunications System (UMTS) and L TE; Mobility enhancements for Home Node B (HNB) and Home enhanced Node B (HeNB) (Release 11 )", 3GPP Standard; 3GPP TR 37.803, 3rd Generation Partnership Project (3GPP), Mobile Competence C.*
NEC, "TNL Address Discovery and X2 Setup—Preferred Solutions", 3GPP TSG-RAN3 Meeting #79bis, R3-130738, Chicago, USA, Apr. 15-19, 2013, pp. 1-3. URL: http://www.3gpp.org/ftp/tsg_ran/WG3_lu/TSGR3_79bis/Docs/R3-130738.zip.
Japanese Office Action for JP Application No. 2016-517577 dated Apr. 19, 2017.
Alcatel-Lucent, Restructuring of GW Proxy section, 3GPP TSG-RAN WG3#79 R3-130178, Jan. 18, 2013 to Feb. 1, 2013, 25 pages.
CATT, Discussion on X2-GW, 3GPP TSG-RAN WG3#78 R3-122585, Oct. 8-12, 2012, pp. 1-4.
Mitsubishi Electric, Full and Routing X2 Proxy Options, 3GPP TSG-RAN WG3#78 R3-122584, Nov. 12-16, 2012, pp. 1-3.
New PostCom, Potential architecture for dual connectivity, 3GPP TSG-RAN WG2#81 R2-130424, Jan. 28, 2013 to Feb. 1, 2013, pp. 1-2.
CATT, Issues on PCFICH detection in LTE-A, 3GPP TSG-RAN WG 1#61 R1-102640, May 10-14, 2010, 3 pages.
Notification of Reasons for Refusal dated Dec. 4, 2018 from the Japanese Patent Office in application No. 2018-056070.
Japanese Office Action for JP Application No. 2018-056070 dated Mar. 12, 2019 with English Translation.
International Search Report for PCT Application No. PCT/JP2014/075768, dated Jan. 28, 2015.
Written opinion for PCT Application No. PCT/JP2014/075768.
3rd Generation Partnership Project; Technical Specification Group Radio Access Network; Scenarios and requirements for small cell enhancements for E-UTRA and E-UTRAN (Release 12), 3GPP TR 36.932 V12.1.0, Mar. 2013. Cited in the Specification.
3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.7.0, Sep. 2013. Cited in the Specification.
3rd Generation Partnership Project; Technical Specification Group Radio Access Network; Evolved Universal Terrestrial Radio Access Network (E-UTRAN); X2 application protocol (X2AP) (Release 11), 3GPP TS 36.423 V11.6.0, Sep. 2013. Cited in the Specification.
3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.5.0, Sep. 2013.Cited in the Specification.
3rd Generation Partnership Project; Technical Specification Group Radio Access Network; UTRAN Iurh interface Radio Network Subsystem Application Part (RNSAP) User Adaption (RNA) signalling (Release 11), 3GPP TS 25.471 V11.2.0, Mar. 2013. Cited in the Specification.
Ericsson, "X2 Setup through an X2-GW", 3GPP Draft; R3-130258. 3rd Generation Partnership Project (3GPP), Mobile Competence Centre; 650, Route Des Lucioles; F-06921 Sophia-Antipolis Cedex; France, vol. RAN WG3. No. Malta; Jan. 28, 2013-Feb. 1, 2013, Jan. 19, 2013 (Jan. 19, 2013). XP050671073. Cited in ISR.
"3rd Generation Partnership Project;Technical Specification Group Radio Access Network; Universal Mobile Telecommunications System (UMTS) and LTE; Mobility enhancements for Home Node B (HNB) and Home enhanced Node B (HeNB) (Release 11)", 3GPP Standard; 3GPP TR 37.803. 3rd Generation Partnership Project (3GPP), Mobile Competence Centre; 650. Route Des Lucioles; F-06921 Sophia-Antipolis Cedex; France, vol. RAN WG3. No. V11.2.0, Jun. 27, 2013 (Jun. 27, 2013). pp. 1-116. XP050711892. Cited in ISR.
Nokia Siemens Networks et al: "X2-proxy", 3GPP Draft; R3-120138 X2-Proxy. 3rd Generation Partnership Project (3GPP), Mobile Competence Centre; 650. Route Des Lucioles; F-06921 Sophia-Antipolis Cedex; France, vol. RAN WG3. No. Dresden. Germany; Feb. 6, 2012-Feb. 10, 2012. Jan. 30, 2012 (Jan. 30, 2012). XP050566505. Cited in ISR.
NEC: "Further Consideration for Routing-Proxy", 3GPP Draft; R3-132148 RoutingEfficiency V02. 3rd Generation Partnership Project (3GPP). Mobile Competence Centre; 650. Route Des Lucioles; F-06921 Sophia-Antipolis Cedex; France, vol. RAN WG3. No. San Fransisco. USA; Nov. 11, 2013-Nov. 15, 2013, Nov. 2, 2013 (Nov. 2, 2013). XP050755155. Cited in ISR.
Huawei, "HeNBs switch on/off Handling", 3GPP TSG WG3 #81 meeting; R3-131251, Aug. 2013.

* cited by examiner

COMMUNICATION SYSTEM

This application is a National Stage Entry of PCT/JP2014/075768 filed on Sep. 22, 2014, which claims priority from United Kingdom Patent Application 1317221.8 filed on Sep. 27, 2013, the contents of all of which are incorporated herein by reference, in their entirety.

TECHNICAL FIELD

The present invention relates to a communication system and to components thereof for providing communication services to mobile or fixed communication devices. The invention has particular but not exclusive relevance to the implementation of a so-called X2 gateway (a gateway that connects 'small' cells or Low Power Nodes (LPNs) and regular base stations using an X2 protocol) in Long Term Evolution (LTE) communication systems currently being developed by the $3^{rd}$ Generation Partnership Project (3GPP).

BACKGROUND ART

In 3GPP LTE networks, a base station (i.e. evolved NodeB, eNB) of a Radio Access Network (RAN) transmits data and signalling between a core network (CN) and User Equipment (UEs) located within the base station's coverage area.

Recent developments in communication networks have seen increased deployment of so called 'small' cells operated by Low Power Nodes (LPNs), such as pico eNBs, femto eNBs, Home eNBs (HeNBs) or the like, which cells have a smaller coverage area than existing macro cells operated by a higher power macro base station. Networks comprising a number of different cell types, for example a network comprising a macro cell and a femto cell, are referred to as Heterogeneous Networks, or HetNets.

The LPNs/small cell base stations that operate small cells can typically communicate with the core network and with macro base stations via a small cell gateway. A small cell gateway typically has a so-called X2 gateway ('X2-GW') functionality effectively to provide X2 interface connectivity (albeit indirect) between respective LPN/small cell base stations (and between the LPN/small cell base stations and macro base stations). Some small cell gateways also have a so-called home evolved nodeB gateway (HeNB-GW) functionality to provide connectivity from the LPN/small cell base station to the core network, although such connectivity from the LPN/small cell base station to the core network may also be provided directly, e.g. without requiring any HeNB-GW functionality.

More recently the need to make further enhancements to small cells using low-power nodes has been identified as one of the most important topics for further development of 3GPP standards compliant communication systems in order to enable such communication systems to cope with increases in mobile traffic especially for hotspot deployments in indoor and outdoor scenarios. According to this interest in small cell enhancements, scenarios and requirements for small cell enhancements were studied and captured in a 3GPP technical report (3GPP TR 36.932 V12.1.0), the contents of which are herein incorporated by reference.

In such deployment scenarios, possibly involving a large number of base stations (of various types), the volume of X2 signalling in the communication system may be significant, especially when some of the base stations (e.g. low power nodes) are added to, or removed from, the system in dependence on the overall load of the network and/or the like. For example, some low power nodes, such as home base stations, may be configured to serve only a small number of subscribers (e.g. a specific group of subscribers) and hence such low power nodes may be powered up and connected to the network only when these subscribers are in the vicinity of their dedicated nodes. On the other hand, when such low power nodes are disconnected from the network (e.g. when their services are not required), they may operate in a power saving node, or they may be completely switched off. However, every time a base station is being connected to or disconnected from the system, each of its neighbour base stations need to be updated accordingly, so that they do not attempt to communicate with (or hand over user equipment to) any disconnected base station. Such updates may thus result in frequent re-configuration of the X2 connections between neighbouring base stations necessitating exchange of appropriate X2 signalling between them. Moreover, where there are a large number of items of user equipment (UEs) such as mobile (cellular) telephones, or the like, moving between cells, the amount of X2 signalling for facilitating the mobility of the UEs, handled by the X2-GW may also be particularly heavy.

There are two different kind of X2-GW architectures being considered by 3GPP: i) a full-proxy, and ii) a routing-proxy based X2-GW architecture. A full-proxy gateway is considered as a peer from the perspective of the X2 protocol, and hence a full-proxy gateway usually terminates X2 setup signalling from the base stations. On the other hand, a routing-proxy gateway simply routes X2 Application Protocol (X2AP) messages whilst the base stations maintain an end-to-end X2 connection between each other. Hence, a full-proxy gateway acts as a concentrator from the perspective of both the X2 protocol and the Stream Control Transmission Protocol (SCTP), whereas a routing-proxy acts as a concentrator from the perspective of SCTP. Since the X2-GW is an additional communication node between the base stations, X2-level routing of messages requires the sender (e.g. a source base station) to identify the intended recipient of its message (e.g. a target base station) using an identifier of the recipient (hereafter referred to as a 'target ID'). Such a target ID can be provided in the form of a Radio Network Layer identifier (RNL-ID), which may be obtained when a source base station discovers a target base station, e.g. using its Automatic Neighbour Relation (ANR) functionality as defined in 3GPP in TS 36.300 V11.7.0, the contents of which are incorporated herein by reference. The target ID may also be provided in the form of an IP Address, or the like, that can be obtained through any Transport Network Layer (TNL) address discovery procedure.

It has been proposed by 3GPP that the target ID should preferably be in the form of an RNL-ID. Using the RNL-ID, which is understood by each standard compliant base station and X2-GW, it is possible to route each X2AP message to the correct target base station (via the X2-GW) even in an environment in which different nodes are provided by different manufacturers and/or operated by different network operators.

In such scenarios when an X2-GW is provided between base stations, the base stations communicating X2AP messages with each other need to include the RNL-ID of the target base station in a suitable information element (IE) within the X2AP message sent to the X2-GW (along with one or more other information elements intended for the target base station). Before sending an X2AP message via the X2-GW, the X2AP message is encoded by the sending base station in accordance with the Abstract Syntax Notation (ASN.1) coding technique described in the European Telecommunications Standards Institute (ETSI) guide no. 200 351, the contents of which are incorporated herein by reference. Thus, when the X2-GW receives such an X2AP message from a base station for forwarding to a designated target base station, the X2-GW has to decode the contents of the X2AP message, in order to locate the IE carrying the RNL-ID of the target in the decoded message, before identifying the intended recipient base station, based on the RNL-ID (e.g. from a look-up table comprising entries of base stations and their associated RNL-IDs), and forwarding the X2AP message to the target base station accordingly.

Whilst this procedure ensures that the base stations can send X2AP messages securely via an X2-GW, a significant amount of processing is required, at the X2-GW, which introduces delays and/or limits the number of messages that can be concurrently processed by the X2-GW. This is a particular issue given the potentially large number, and relatively high frequency, of X2AP messages that will likely be sent via the X2 gateway especially when there are a large number of base stations (LPNs and macro) connected via a single X2 gateway.

SUMMARY OF INVENTION

Accordingly, preferred embodiments of the present invention aim to provide methods and apparatus which overcome or at least alleviate the above issues.

In one aspect, the invention provides a gateway apparatus for a communication system, the communication system comprising a plurality of base stations, the gateway apparatus being operable to facilitate communication of messages configured in accordance with a first, base station to base station, application protocol between said plurality of base stations via said gateway apparatus. The gateway apparatus comprises: communicating means for communicating with said plurality of base stations using messages configured in accordance with a second application protocol, said communicating means being operable to receive, from a first base station of said plurality of base stations, a message configured in accordance with the second application protocol as a received message. The received message configured in accordance with the second application protocol comprises: (a) a message configured in accordance with the first application protocol, wherein said message configured in accordance with the first application protocol is destined for a second base station and forms at least part of a data unit of said received message configured in accordance with the second application protocol; and (b) information for identifying said second base station, wherein said information identifying said second base station forms at least part of a header of said received message configured in accordance with said second application protocol. The gateway apparatus comprises obtaining means for obtaining, from said header of said received message configured in accordance with the second application protocol, said information identifying said second base station as obtained information; and routing means for routing said message configured in accordance with the first application protocol, to said second base station identified by said obtained information identifying said second base station.

The routing means might be operable to route said message configured in accordance with the first application protocol as at least part of (e.g. in a service data unit of) a message configured in accordance with the second application protocol.

The gateway apparatus might comprise means for maintaining: i) a first Stream Control Transmission Protocol, SCTP, association with said first base station; and ii) a second SCTP association with said second base station; and in this case the communicating means might be operable to receive said message configured in accordance with the first application protocol using said first SCTP association, and said routing means might be operable route said message configured in accordance with the first application protocol, to said second base station, using said second SCTP association.

The data unit of said received message configured in accordance with the second application protocol might comprise a plurality of messages configured in accordance with the first application protocol.

The data unit of said received message configured in accordance with the second application protocol might comprise a service data unit (SDU) configured in accordance with the second application protocol and carrying at least one protocol data unit (PDU) configured in accordance with the first application protocol, wherein the at least one PDU comprises the or each message configured in accordance with the first application protocol.

The information identifying said second base station might comprise at least one of a Radio Network Layer identifier (RNL-ID) associated with said second base station; and a Transport Network Layer (TNL) address, associated with said second base station.

The header of said received message might comprise an RNL-ID associated with said first base station.

In one aspect, the invention provides a base station for a communication system, the communication system comprising a plurality of base stations and a gateway apparatus operable to facilitate communication of messages configured in accordance with a first, base station to base station, application protocol between said plurality of base stations via said gateway apparatus. The base station comprises: communicating means for communicating with said gateway apparatus using messages configured in accordance with a second application protocol; and generating means for generating a message configured in accordance with the second application protocol as a generated message. The generated message configured in accordance with the second application protocol comprises: (a) a message configured in accordance with the first application protocol, wherein said message configured in accordance with the first application protocol is destined for a second base station and forms at least part of a data unit of said generated message configured in accordance with the second application protocol; and (b) information for identifying said second base station, wherein said information identifying said second base station forms at least part of a header of said generated message configured in accordance with said second application protocol. The communicating means is operable to send, to said gateway apparatus said generated message configured in accordance with the second application protocol.

The data unit of said generated message configured in accordance with the second application protocol might comprise a plurality of messages configured in accordance with the first application protocol.

The data unit of said generated message configured in accordance with the second application protocol might comprise a service data unit (SDU) configured in accordance with the second application protocol and carrying at least one protocol data unit (PDU) configured in accordance with the first application protocol, and the at least one PDU might comprise the or each message configured in accordance with the first application protocol.

The first application protocol might comprise an X2 application protocol in accordance with the Long Term Evolution (LTE) set of standards.

In one aspect, the invention provides a gateway apparatus for a communication system, the communication system comprising a plurality of base stations, the gateway apparatus being operable to facilitate communication of messages configured in accordance with a base station to base station application protocol between said plurality of base stations via said gateway apparatus. The gateway apparatus comprises: communicating means for communicating with said plurality of base stations using messages configured in accordance with the base station to base station application protocol, said communicating means being operable to receive, from a first base station of said plurality of base stations, a message configured in accordance with the base station to base station application protocol as a received message. The received message comprises: (a) a further message, destined for a second base station, forming at least part of an information container that is transparent to said gateway apparatus; and (b) information for identifying said second base station, wherein said information identifying said second base station forms at least part of said received message other than said information container. The gateway apparatus comprises obtaining means for obtaining from said received message configured in accordance with the base station to base station application protocol, said information identifying said second base station as obtaining information; and routing means for routing said message configured in accordance with the base station to base station application protocol, to said second base station identified by said obtained information identifying said second base station.

The information container might comprise an information element that is transparent to said gateway apparatus.

The information identifying said second base station might comprise at least one of a Radio Network Layer identifier (RNL-ID) associated with said second base station; and a Transport Network Layer (TNL) address, associated with said second base station.

The received message might comprise information for identifying said first base station, and said information identifying said first base station might form at least part of said received message other than said information container.

In one aspect, the invention provides a base station for a communication system, the communication system comprising a plurality of base stations and a gateway apparatus operable to facilitate communication of messages configured in accordance with a base station to base station application protocol between said plurality of base stations via said gateway apparatus. The base station comprises generating means for generating a message configured in accordance with the base station to base station application protocol as a generated message, wherein the generated message comprises: (a) a further message, destined for a second base station of said plurality of base stations, forming at least part of an information container that is transparent to said gateway apparatus; and (b) information for identifying said second base station, wherein said information identifying said second base station forms at least part of said generated message other than said information container. The base station comprises sending means for sending said generated message to said gateway apparatus.

The information container might comprise an information element that is transparent to said gateway apparatus.

The information identifying said second base station might comprise at least one of a Radio Network Layer identifier (RNL-ID) associated with said second base station; and a Transport Network Layer (TNL) address associated with said second base station.

The generated message might comprise information for identifying said base station, and said information identifying said base station might form at least part of said received message other than said information container.

In one aspect, the invention provides a gateway apparatus for a communication system, the communication system comprising a plurality of base stations, the gateway apparatus being operable to facilitate communication of messages configured in accordance with a base station to base station application protocol between said plurality of base stations via said gateway apparatus. The gateway apparatus comprises: communicating means for communicating with said plurality of base stations using messages configured in accordance with the base station to base station application protocol, said communicating means being operable to receive, from a first base station of said plurality of base stations, a message configured in accordance with the base station to base station application protocol, destined for a second base station as a received message. The received message comprises: (a) base station to base station information, destined for a second base station, forming a first part of said received message; and (b) information for identifying said second base station, wherein said information identifying said second base station forms a second part of said received message other than said first part. The gateway apparatus comprises obtaining means for obtaining from said received message said information identifying said second base station as obtained information wherein said first and said second part of said received message are arranged such that said obtaining means obtains information from said second part of said received message without requiring said obtaining means to obtain said base station to base station information from said first part; and routing means for routing said message configured in accordance with the base station to base station application protocol to said second base station identified by said obtained information identifying said second base station.

The received message configured in accordance with the base station to base station application protocol might be encoded, and said obtaining means might be operable to decode said second part.

The received message configured in accordance with the base station to base station application protocol might comprise a message encoded using an Abstract Syntax Notation (ASN.1) coding technique.

The information identifying said second base station might comprises a Radio Network Layer identifier (RNL-ID) associated with said second base station.

In one aspect, the invention provides a base station for a communication system, the communication system comprising a plurality of base stations and a gateway apparatus operable to facilitate communication of messages configured in accordance with a base station to base station application protocol between said plurality of base stations via said gateway apparatus, the base station comprising: generating means for generating a message configured in accordance with the base station to base station application protocol, destined for a second base station of said plurality of base stations as a generated message, wherein said generated message comprises: (a) base station to base station information, destined for said second base station, forming a first part of said generated message; and (b) information for identifying said second base station, wherein said information identifying said second base station forms a second part of said generated message other than said first part; wherein said generating means is operable to arrange said first and said second part of said generated message such that said gateway apparatus can obtain information from said second part of said generated message without requiring said gateway apparatus to obtain said base station to base station information from said first part. The base station comprises sending means for sending said generated message to said gateway apparatus.

The generating means might be operable to encode said generated message using an Abstract Syntax Notation (ASN.1) coding technique.

The base station to base station application protocol might comprise an X2 protocol in accordance with the Long Term Evolution (LTE) set of standards.

In one aspect, the invention provides a gateway apparatus for a communication system, the communication system comprising a plurality of base stations, the gateway apparatus being operable to facilitate communication of messages configured in accordance with a first, base station to base station, application protocol between said plurality of base stations via said gateway apparatus, the gateway apparatus comprising a processor and a transceiver, wherein: said transceiver is configured to communicate with said plurality of base stations using messages configured in accordance with a second application protocol, and said transceiver is operable to receive, from a first base station of said plurality of base stations, a message configured in accordance with the second application protocol as a received message, wherein said received message configured in accordance with the second application protocol comprises: (a) a message configured in accordance with the first application protocol, wherein said message configured in accordance with the first application protocol is destined for a second base station and forms at least part of a data unit of said received message configured in accordance with the second application protocol; and (b) information for identifying said second base station, wherein said information identifying said second base station forms at least part of a header of said received message configured in accordance with said second application protocol. The processor is configured to obtain, from said header of said received message configured in accordance with the second application protocol, said information identifying said second base station as obtained information; and the transceiver is configured to route said message configured in accordance with the first application protocol, to said second base station identified by said obtained information identifying said second base station.

In one aspect, the invention provides a gateway apparatus for a communication system, the communication system comprising a plurality of base stations, the gateway apparatus being operable to facilitate communication of messages configured in accordance with a base station to base station application protocol between said plurality of base stations via said gateway apparatus, the gateway apparatus comprising a processor and a transceiver, wherein: said transceiver is configured to communicate with said plurality of base stations using messages configured in accordance with the base station to base station application protocol, and said transceiver is operable to receive, from a first base station of said plurality of base stations, a message configured in accordance with the base station to base station application protocol as received message, wherein said received message comprises: (a) a further message, destined for a second base station, forming at least part of an information container that is transparent to said gateway apparatus; and (b) information for identifying said second base station, wherein said information identifying said second base station forms at least part of said received message other than said information container. The processor is configured to obtain from said received message configured in accordance with the base station to base station application protocol, said information identifying said second base station as obtained information; and the transceiver is configured to route said message configured in accordance with the base station to base station application protocol, to said second base station identified by said obtained information identifying said second base station.

In one aspect, the invention provides a gateway apparatus for a communication system, the communication system comprising a plurality of base stations, the gateway apparatus being operable to facilitate communication of messages configured in accordance with a base station to base station application protocol between said plurality of base stations via said gateway apparatus, the gateway apparatus comprising a processor and a transceiver, wherein: the transceiver is configured to communicate with said plurality of base stations using messages configured in accordance with the base station to base station application protocol, and said transceiver is operable to receive, from a first base station of said plurality of base stations, a message configured in accordance with the base station to base station application protocol, destined for a second base station as a received message, wherein said received message comprises: (a) base station to base station information, destined for a second base station, forming a first part of said received message; and (b) information for identifying said second base station, wherein said information identifying said second base station forms a second part of said received message other than said first part. The processor is configured to obtain from said received message said information identifying said second base station as obtained information wherein said first and said second part of said received message are arranged such that said processor can obtain information from said second part of said received message without requiring to obtain said base station to base station information from said first part; and the transceiver is configured to route said message configured in accordance with the base station to base station application protocol to said second base station identified by said obtained information identifying said second base station.

In one aspect, the invention provides a base station for a communication system, the communication system comprising a plurality of base stations and a gateway apparatus operable to facilitate communication of messages configured in accordance with a first, base station to base station, application protocol between said plurality of base stations via said gateway apparatus, the base station comprising a processor and a transceiver, wherein: the transceiver is configured to communicate with said gateway apparatus using messages configured in accordance with a second application protocol; the processor is configured to generate a message configured in accordance with the second application protocol as a generated message, wherein said generated message configured in accordance with the second application protocol comprises: (a) a message configured in accordance with the first application protocol, wherein said message configured in accordance with the first application protocol is destined for a second base station and forms at least part of a data unit of said generated message configured in accordance with the second application protocol; and (b) information for identifying said second base station, wherein said information identifying said second base station forms at least part of a header of said generated message configured in accordance with said second application protocol. The transceiver is operable to send, to said gateway apparatus said generated message configured in accordance with the second application protocol.

In one aspect, the invention provides a base station for a communication system, the communication system comprising a plurality of base stations and a gateway apparatus operable to facilitate communication of messages configured in accordance with a base station to base station application protocol between said plurality of base stations via said gateway apparatus, the base station comprising a processor and a transceiver, wherein: the processor is configured to generate a message configured in accordance with the base station to base station application protocol as a generated message, wherein said generated message comprises: (a) a further message, destined for a second base station of said plurality of base stations, forming at least part of an information container that is transparent to said gateway apparatus; and (b) information for identifying said second base station, wherein said information identifying said second base station forms at least part of said generated message other than said information container. The transceiver is configured to send said generated message to said gateway apparatus.

In one aspect, the invention provides a base station for a communication system, the communication system comprising a plurality of base stations and a gateway apparatus operable to facilitate communication of messages configured in accordance with a base station to base station application protocol between said plurality of base stations via said gateway apparatus, the base station comprising a processor and a transceiver, wherein: the processor is configured to generate a message configured in accordance with the base station to base station application protocol, destined for a second base station of said plurality of base stations as a generated message, wherein said generated message comprises: (a) base station to base station information, destined for said second base station, forming a first part of said generated message; and (b) information for identifying said second base station, wherein said information identifying said second base station forms a second part of said generated message other than said first part. The processor is operable to arrange said first and said second part of said generated message such that said gateway apparatus can obtain information from said second part of said generated message without requiring said gateway apparatus to obtain said base station to base station information from said first part; and the transceiver is configured to send said generated message to said gateway apparatus.

The gateway apparatus might comprise at least one of a small cell gateway and an X2 gateway operating in accordance with the LTE set of standards.

The base station might comprise at least one of a macro base station, a pico base station, a femto base station, and a home base station operating in accordance with the LTE set of standards.

In one aspect, the invention provides a communication system comprising the above described gateway apparatus and the above described base station.

In one aspect, the invention provides a method performed by a gateway apparatus in a communication system comprising a plurality of base stations, the gateway apparatus being operable to facilitate communication of messages configured in accordance with a first, base station to base station, application protocol between said plurality of base stations via said gateway apparatus, the method comprising: receiving, from a first base station of said plurality of base stations, a message configured in accordance with a second application protocol as a received message, wherein said received message configured in accordance with the second application protocol comprises: (a) a message configured in accordance with the first application protocol, wherein said message configured in accordance with the first application protocol is destined for a second base station and forms at least part of a data unit of said received message configured in accordance with the second application protocol; and (b) information for identifying said second base station, wherein said information identifying said second base station forms at least part of a header of said received message configured in accordance with said second communication protocol; obtaining, from said header of said received message configured in accordance with the second application protocol, said information identifying said second base station as obtained information; and routing said message configured in accordance with the first application protocol, to said second base station identified by said obtained information identifying said second base station.

In one aspect, the invention provides a method performed by a gateway apparatus in a communication system comprising a plurality of base stations, the gateway apparatus being operable to facilitate communication of messages configured in accordance with a base station to base station application protocol between said plurality of base stations via said gateway apparatus, the method comprising: receiving, from a first base station of said plurality of base stations, a message configured in accordance with a base station to base station application protocol as a received message, wherein said received message comprises: (a) a further message, destined for a second base station, forming at least part of an information container that is transparent to said gateway apparatus; and (b) information for identifying said second base station, wherein said information identifying said second base station forms at least part of said received message other than said information container; obtaining from said received message configured in accordance with the base station to base station application protocol, said information identifying said second base station as obtained information; and routing said message configured in accordance with the base station to base station application protocol, to said second base station identified by said obtained information identifying said second base station.

In one aspect, the invention provides a method performed by a gateway apparatus in a communication system comprising a plurality of base stations, the gateway apparatus being operable to facilitate communication of messages configured in accordance with a base station to base station application protocol between said plurality of base stations via said gateway apparatus, the method comprising: receiving, from a first base station of said plurality of base stations, a message configured in accordance with a base station to base station application protocol, destined for a second base station as a received message, wherein said received message comprises: (a) base station to base station information, destined for a second base station, forming a first part of said received message; and (b) information for identifying said second base station, wherein said information identifying said second base station forms a second part of said received message other than said first part; obtaining from said received message said information identifying said second base station as obtained information wherein said first and said second part of said received message are arranged such that said obtaining obtains information from said second part of said received message without requiring said obtaining to obtain said base station to base station information from said first part; and routing said message configured in accordance with the base station to base station application protocol to said second base station identified by said obtained information identifying said second base station.

In one aspect, the invention provides a method performed by a base station in a communication system comprising a plurality of base stations and a gateway apparatus operable to facilitate communication of messages configured in accordance with a first, base station to base station, application protocol between said plurality of base stations via said gateway apparatus, the method comprising: generating a message configured in accordance with a second application protocol as a generated message, wherein said generated message configured in accordance with the second application protocol comprises: (a) a message configured in accordance with the first application protocol, wherein said message configured in accordance with the first application protocol is destined for a second base station and forms at least part of a data unit of said generated message configured in accordance with the second application protocol; and (b) information for identifying said second base station, wherein said information identifying said second base station forms at least part of a header of said generated message configured in accordance with said second application protocol; and sending, to said gateway apparatus said generated message configured in accordance with the second application protocol.

In one aspect, the invention provides a method performed by a base station in a communication system comprising a plurality of base stations and a gateway apparatus operable to facilitate communication of messages configured in accordance with a base station to base station application protocol between said plurality of base stations via said gateway apparatus, the method comprising: generating a message configured in accordance with the base station to base station application protocol as a generated message, wherein said generated message comprises: (a) a further message, destined for a second base station of said plurality of base stations, forming at least part of an information container that is transparent to said gateway apparatus; and (b) information for identifying said second base station, wherein said information identifying said second base station forms at least part of said generated message other than said information container; and sending said generated message to said gateway apparatus.

In one aspect, the invention provides a method performed by a base station in a communication system comprising a plurality of base stations and a gateway apparatus operable to facilitate communication of messages configured in accordance with a base station to base station application protocol between said plurality of base stations via said gateway apparatus, the method comprising: generating a message configured in accordance with the base station to base station application protocol, destined for a second base station of said plurality of base stations as a generated message, wherein said generated message comprises: (a) base station to base station information, destined for said second base station, forming a first part of said generated message; and (b) information for identifying said second base station, wherein said information identifying said second base station forms a second part of said generated message other than said first part; wherein said generating is operable to arrange said first and said second part of said generated message such that said gateway apparatus can obtain information from said second part of said generated message without requiring said gateway apparatus to obtain said base station to base station information from said first part; and sending said generated message to said gateway apparatus.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Although for efficiency of understanding for those of skill in the art, the invention will be described in detail in the context of a 3G system (UMTS, LTE), the principles of the invention can be applied to other systems (such as WiMAX) in which (home/small cell) base stations communicate via a signalling gateway with the corresponding elements of the system changed as required.

BRIEF DESCRIPTION OF DRAWINGS

Embodiments of the invention will now be described, by way of example, with reference to the accompanying drawings in which.

DESCRIPTION OF EMBODIMENTS

Overview

Figure 1:
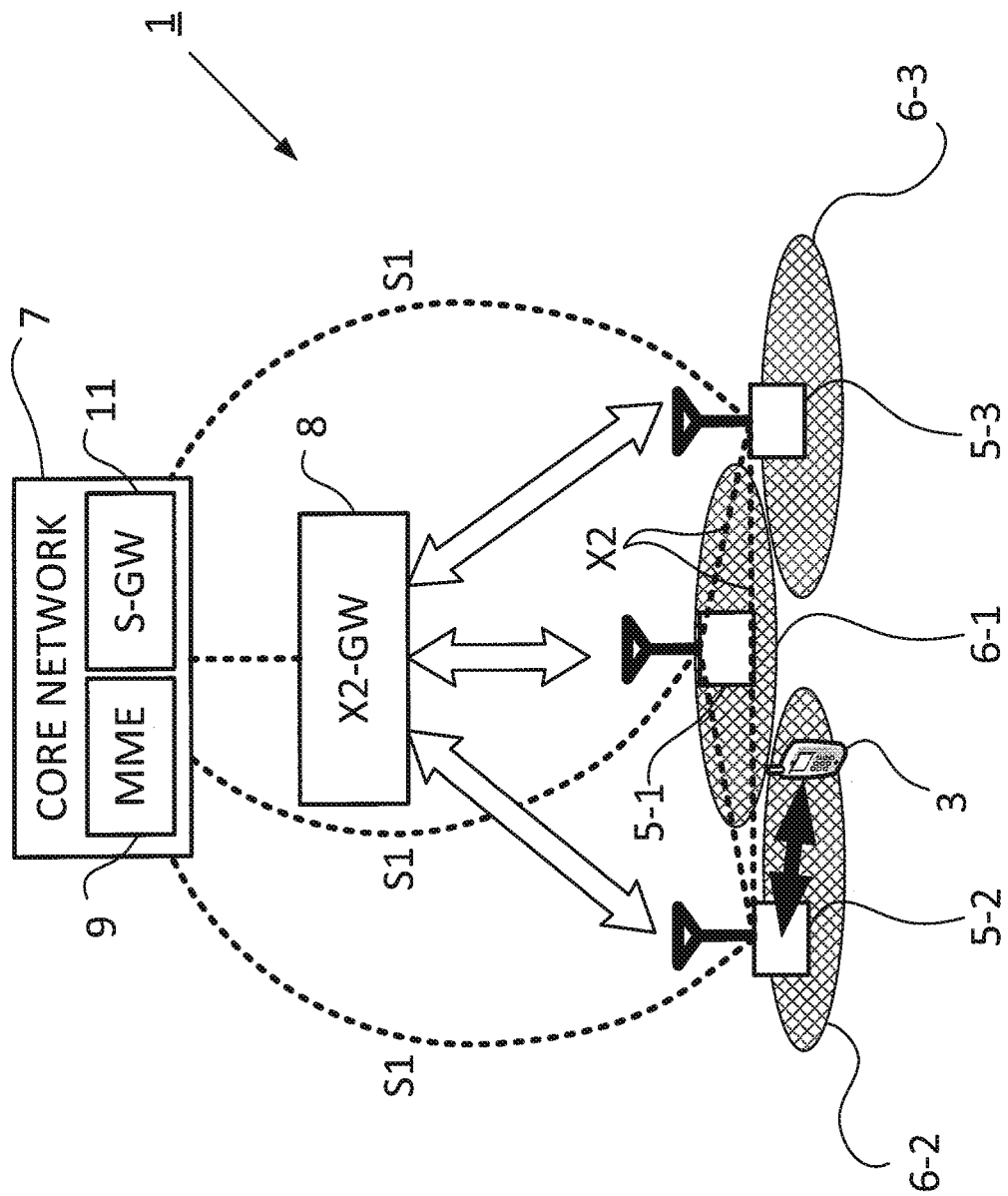
FIG. 1 schematically illustrates a mobile telecommunication system of a type to which the invention is applicable.

FIG. 1 schematically illustrates a mobile (cellular) telecommunication system 1 including a mobile communication device 3 comprising a mobile telephone (or other compatible user equipment) and a plurality of base stations 5-1 to 5-3, each of which operates an associated cell 6-1 to 6-3. Any of the base stations 5-1 to 5-3 may comprise a regular macro eNB and/or a small cell base station (such as Home evolved NodeB (HeNB), pico or femto base station, and/or the like).

In this example, the mobile communication device 3 is served via a cell 6-2 operated by one of the base stations 5-2. As those skilled in the art will appreciate, whilst one mobile communication device 3 and three base stations 5 are shown in FIG. 1 for illustration purposes, additional user equipment and/or base stations may be present in a deployed system.

Communication between the base stations 5 and a core network 7 is via a so-called 'S1' interface. The core network 7 includes a mobility management entity (MME) 9, a serving gateway (S-GW) 11 (and other communication entities such as a Packet Data Network (PDN) Gateway (P-GW), which have also been omitted for sake of simplicity).

An 'X2' interface is also provided for communication between neighbouring base stations 5 to facilitate data exchange between them. In this example, a small cell gateway (denoted 'X2-GW') is provided to implement the functionality of an X2 gateway 8, thus communications between the base stations 5 over the X2 interface are routed via the X2-GW 8 (rather than routing them directly). The X2-GW 8 may also be connected to the other networks (e.g. the core network 7), for operations and maintenance (OAM) purposes, and/or the like.

The X2-GW 8 between the base stations 5 serves as a scalable concentrator of SCTP/X2 signalling and facilitates the initial X2 setup (and any subsequent re-configuration) between base stations 5. The routing of X2AP messages by the X2-GW 8 between base stations relies on an identification of the intended recipient of the message in the form of a target ID (e.g. an RNL-ID associated with the target base station). Further, given that X2AP messages traverse through two disjoint SCTP associations, a target needs to identify where a given X2AP message has originated from. For this purpose, a source includes its own identifier in the form of a 'source ID' in each X2AP message it sends. Thus an X2AP message typically includes a source ID and a target ID.

However, in this example, an information element (e.g. 'IE1') carrying the target RNL-ID (and possibly the source RNL-ID) is not encoded as the last (or near last) information element of the X2AP message (as would normally be the case for new information elements due to backward compatibility considerations). Although the coding is preferably based on a current ASN. 1 technique, a new X2AP message structure is used, in which the 'IE1' information element is included as the first (or near first) information element of the message. Although such X2AP message structure is not conventionally used by 3GPP, backward compatibility is not affected in this case, because X2-GWs are accessible by Rel-12 (or later) base stations only. Accordingly, the sending (source) base station 5 beneficially incorporates this new 'IE1' information element in such a way that the X2-GW 8 is not required to decode the entire X2AP message in order to be able to take an appropriate routing action/decision.

There are a number of ways in which this can be achieved. For example, the base stations 5 and the X2-GW 8 may be configured in accordance with any of the following possibilities (or any appropriate combination thereof) in which, for the purpose of illustration, the X2AP messages referred to are sent between a source base station 5-1 and a target base station 5-2 via the X2-GW 8.

In a first example, the source base station 5-1 applies a special coding policy (while being in line with the current ASN.1 coding) to the message that it sends to the X2-GW 8 such that the 'IE1' carrying the target ID (and source ID) can be decoded without having to decode the entire X2AP message. Specifically, the source base station 5-1 encodes the X2AP messages such that the 'IE1' carrying the target ID is decoded at (or near) the start of the process of decoding the X2AP message (e.g. as the first—or one of the first—decoded information element(s) thereof).

In other words, the X2-AP message is structured by the source base station 5-1 such that the 'IE1' carrying the target ID (e.g. the RNL-ID of a target base station 5-2) is decoded separately from the other information elements (e.g. the RNL-ID is included as a first—or one of the first—information elements in the X2AP message such that the RNL-ID is decoded before a decision on whether or not to decode the other IEs has to be made). The X2-GW 8 begins by decoding the part of the message which includes the RNL-ID and makes an appropriate routing decision without having to process the rest of the message. Thus, it is not necessary for the X2-GW 8 to decode parts (IEs or groups of IEs) of the X2AP message other than the part carrying the RNL-ID. In order to ensure compatibility between base stations and gateways by different manufacturers, the specific coding for the RNL-ID may be beneficially selected or specified by 3GPP, e.g. in an appropriate standards specification, such as Technical Specification (TS) 36.423 V11.6.0 or similar.

In another example, the source and target base stations 5 and the X2-GW 8 each implement a dedicated sub-layer (herein referred to as an 'X2 Adaptation Protocol' (XAP) sub-layer) as part of their respective protocol stacks, which sub-layer is adapted for relaying X2AP messages between base stations (via an X2-GW). Signalling messages over this sub-layer are structured such that each XAP message encapsulates an actual X2AP message (or a group of X2AP messages) sent between base stations 5. This is realised by the source base station 5-1 adding a sub-layer specific header (XAP header) to the X2AP message being sent to the X2-GW 8. In other words, an XAP signalling message comprises an XAP header (a header understood by XAP-compliant devices) and the X2AP message(s)/X2 protocol data unit(s) to be communicated between the base stations 5. The XAP header will include at least a target ID and possibly a source ID as well. In this case, the X2-GW 8 processes the XAP portion of such a signalling message received over the XAP sub-layer and routes the X2AP message included in that signalling message to the target base station 5-2. The X2-GW 8 is not required to implement any X2 protocol specific functionality, although it may do so for compatibility with other (non-XAP compliant) base stations.

Accordingly, the receiving (forwarding) X2-GW 8 does not need to process the entire XAP message (e.g. it does not need to decode the X2AP message therein), only the XAP header containing the RNL-ID for the target base station 5-2. In particular, the X2-GW 8 does not need to process (e.g. decode) any X2 PDU within the XAP signalling. In this possibility therefore, rather than using an information element as in the previous possibility, the RNL-ID is added to a XAP header (which identifies the intended recipient), whilst the actual contents of the X2AP message become the payload of the XAP message. A benefit associated with this example over the first example is that more than one X2AP messages/PDUs may be included in the same XAP message, thus further reducing the processing requirements for the X2-GW 8 per X2AP message sent between the base stations 5. Another added advantage is that X2AP messages do not have to be modified in any form i.e., such 'IE1' information element does not need to be included in every X2AP message. This ensures that a base station (e.g. a macro base station) that maintains indirect as well as a direct X2 connection with another node has a consistent behaviour from the perspective of the X2 protocol. Since the XAP sub-layer is specific to the scenarios involving an X2-GW, XAP signalling (e.g. the XAP header) might not need to be encoded (apart from the X2AP messages included in the XAP signalling) thus reducing the processing requirements at the base stations and the X2-GW. Further details of this approach will be described with reference to FIGS. 5 and 6 below. Advantageously, a conventional ASN.1 coding technique may be used (and adapted, if necessary) for XAP messages. Any component of an XAP PDU other than the XAP header may be encoded as a "transparent" container. Such a transparent container approach is similar to encoding of containers related to 'Handover commands' discussed in 3GPP TS 36.331 V11.5.0 (which are normally included as part of a 'Handover Request Acknowledge' message transmitted by a target base station to a source base station during handover preparation, as further discussed in TS 36.300).

In yet another example, the source base station 5-1 relies on a suitable X2AP message (e.g. any existing, modified, or dedicated X2AP message) to notify the X2-GW 8 about the RNL-ID of the target base station 5-2. In this case, the X2AP message also carries a particular X2 protocol data unit (PDU) that is to be forwarded to the target base station 5-2 by the X2-GW 8. For example, the source base station 5-1 may include the target base station's 5-2 RNL-ID in an appropriately formatted X2AP message, and add to this message a so called 'transparent' container (which includes one or more X2 PDUs) to be forwarded by the X2-GW 8 to the target base station 5-2. A transparent container is, in effect, an information element (which may comprise many smaller information elements) the contents of which are ignored by (and hence 'transparent' to) one or more intermediate communication nodes between the source of a message containing the transparent container and the destination ('target') of the contents of the transparent container. In this example, the transparent container may be implemented by providing a suitable information element within the X2AP message sent via the X2-GW 8, but that the X2-GW, acting as an intermediate communication node for the contents of the transparent container, ignores. This message structure ensures that the X2-GW 8 needs to process only the relevant part of the X2AP message for its routing decision (e.g. only the part of the message that is outside the transparent container), whilst the transparent container includes all IEs/PDUs intended for the target base station 5-2 identified by its RNL-ID. Advantageously, the X2-GW 8 does not need to decode the transparent container and/or the X2 PDUs included therein. A benefit associated with this example is that the use of a transparent container more clearly identifies which parts of the message is to be processed by the X2-GW 8 and which part (i.e. the transparent container) can be ignored in its routing decision. Further details of this approach will be described with reference to FIGS. 7 and 8 below. A source ID can be included as part of a transparent container as this information is required by a target base station to determine where a given X2AP message has originated from.

In summary, in each of the above described possibilities, the source base station ensures (e.g. by appropriate coding and/or message structuring) that the part of the X2AP message to be interpreted by the X2-GW can be processed independently from the rest of the X2AP message (e.g. the part that is mainly intended for the receiving base station). Therefore, the X2-GW does not need to process the entire message in order to locate the IE/header carrying the RNL-ID of a target. The X2-GW is thus able to look up the intended recipient based on the RNL-ID and take an appropriate routing action/decision more efficiently, and forward the X2AP message to the intended recipient, identified by its RNL-ID, without unnecessary delay.

Further, the present routing techniques do not adversely affect the security or standards compliance of signalling between base stations because the messages (at least the part thereof that is intended for the target base station) can still be encoded using the ASN.1 coding technique, if required.

This also improves efficiency of the X2-GW and hence reduces the risk of it becoming a bottleneck, especially in a system having many base stations connected via the same X2-GW, e.g. a system having a large number of small cells. Further, this will also enhances security as the main payload, which is intended for a target, is not decoded by any intermediate X2-GW.

If the X2AP message is encoded, the X2-GW does not need to decode the full X2AP message in order to be able to make a routing decision. This in turn also has the potential to reduce latency (compared to current proposals) in transmission of X2 signalling between base stations via the X2-GW, even when a high volume of X2AP messages are handled by the same X2-GW. Since its processing needs are relatively lower than that of other gateways, the X2-GW can be kept simple and low-cost whilst still being capable of handling a large number of substantially concurrent X2 communications between many base stations.

Base Station

Figure 2:
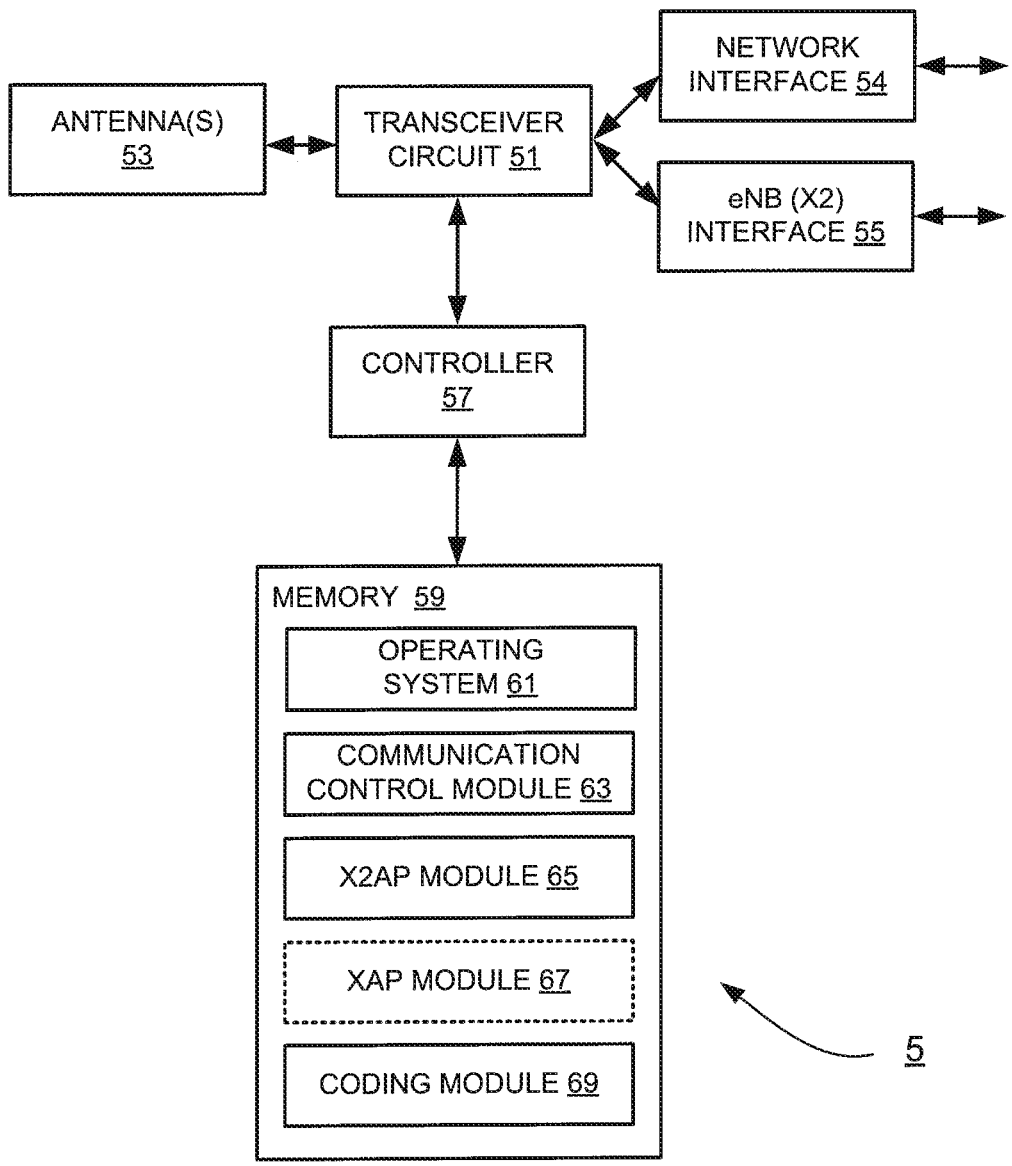
FIG. 2 is a block diagram illustrating the main components of a base station forming part of the system shown in FIG. 1.

FIG. 2 is a block diagram illustrating the main components of one of the base stations 5 shown in FIG. 1, such as serving base station 5-1. As shown, the base station 5 includes transceiver circuit 51 which is operable to transmit signals to, and to receive signals from, the mobile communication device 3 via at least one antenna 53. The base station 5 is also operable to transmit signals to and to receive signals from nodes in the core network 7 (such as the MME 9 or the S-GW 11), either directly or via a small cell gateway (e.g. a HeNB-GW), using network interface 54. The base station 5 is also operable to transmit signals to and to receive signals from other base stations (macro or small) via the X2-GW 8 (which may form part of the small cell gateway) using an eNB (X2) interface 55. The operation of the transceiver circuit 51 is controlled by a controller 57 in accordance with software stored in memory 59. The software includes, among other things, an operating system 61, a communication control module 63, an X2 application protocol (X2AP) module 65, an XAP module 67, and a coding module 69.

Figure 4:
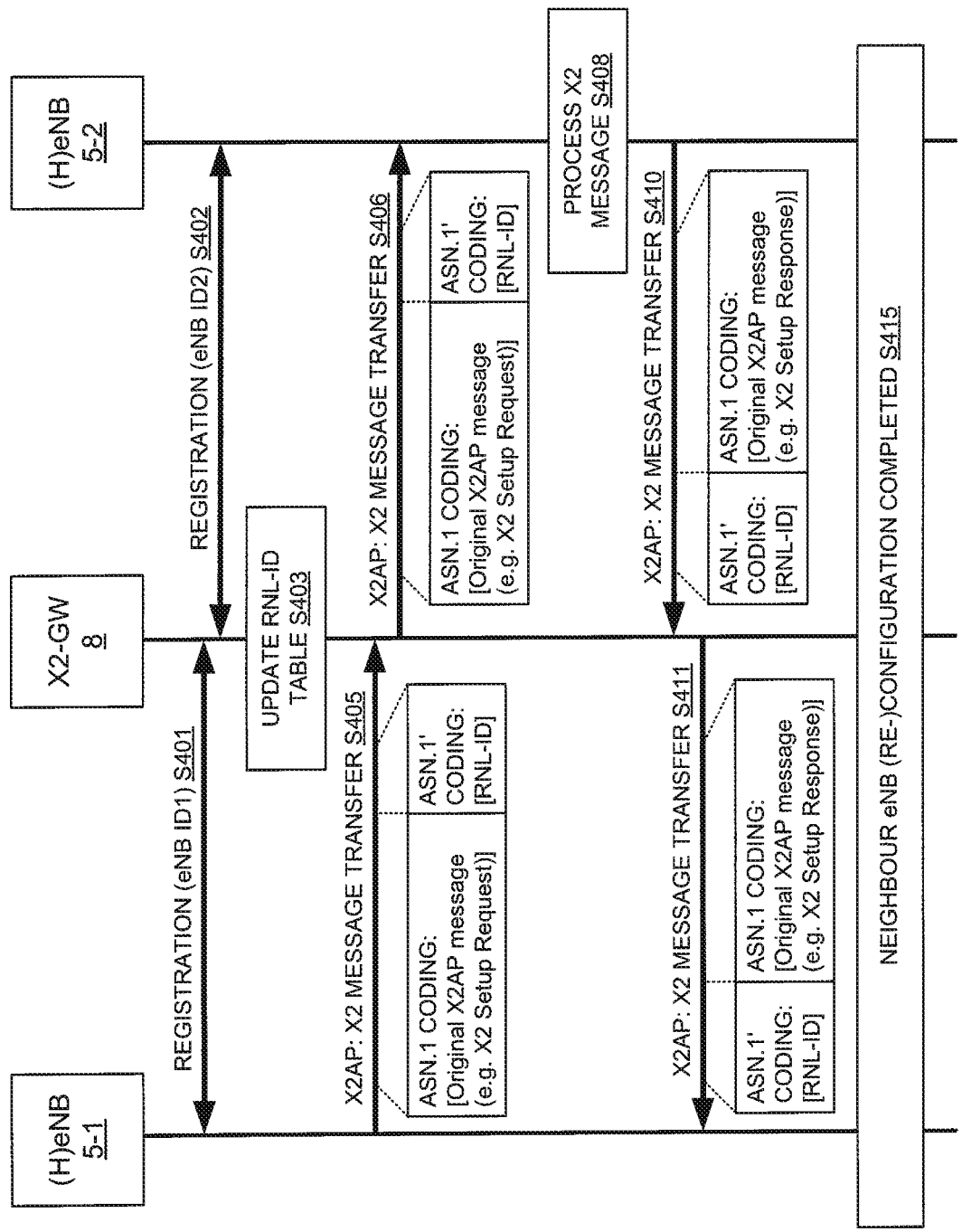
FIG. 4 is an exemplary timing diagram illustrating a method performed by components of the mobile telecommunication system of FIG. 1 whilst carrying out an exemplary embodiment of the invention.
Figure 5:
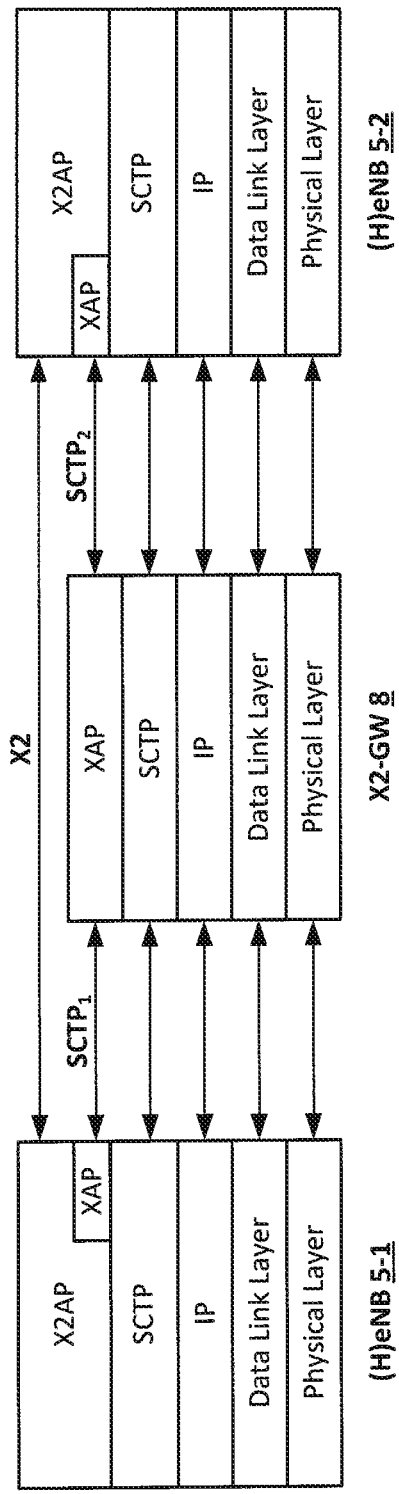
FIG. 5 schematically illustrates an exemplary protocol stack for implementing an exemplary embodiment of the invention.
Figure 6:
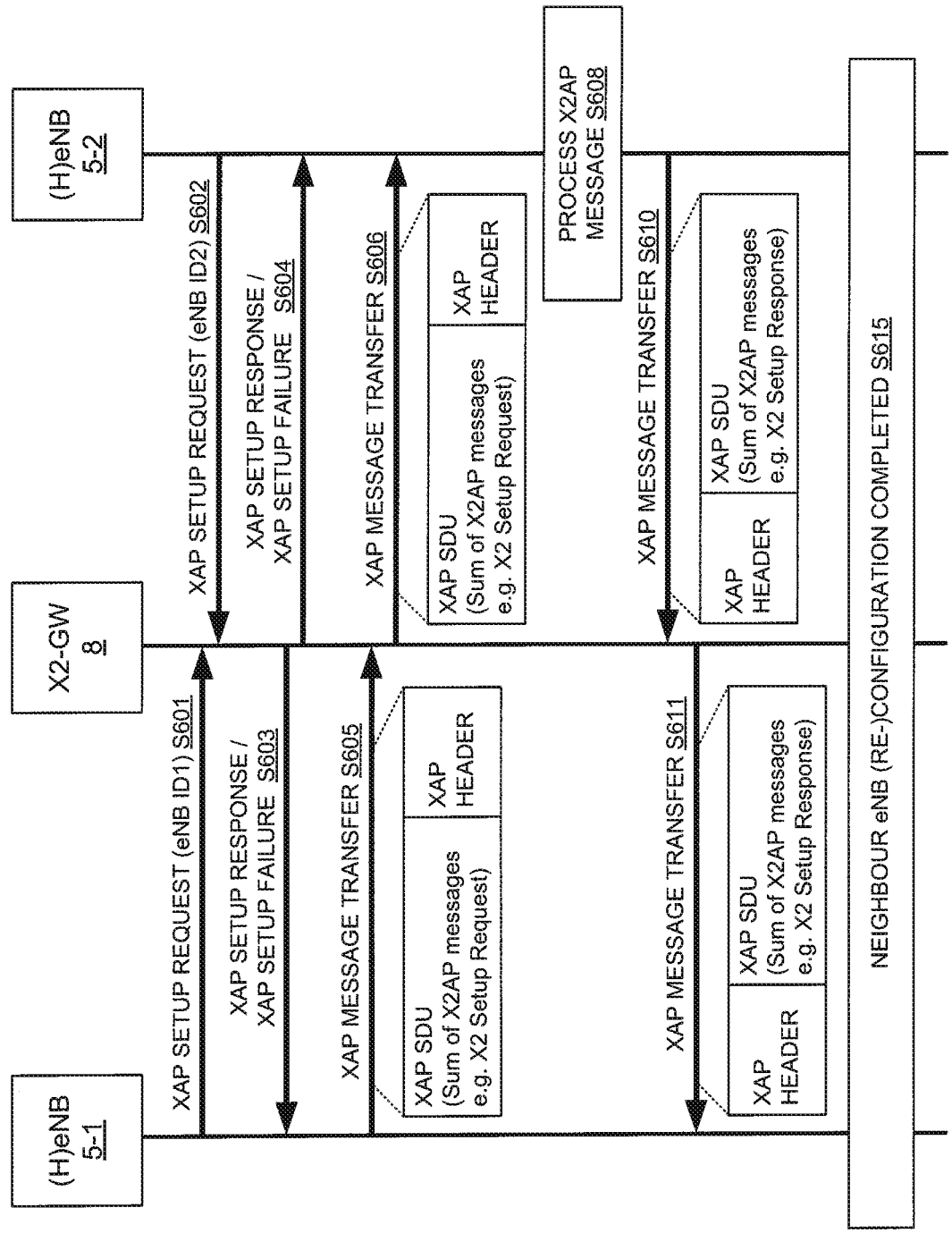
FIG. 6 is an exemplary timing diagram illustrating another method performed by components of the mobile telecommunication system of FIG. 1 whilst carrying out an exemplary embodiment of the invention.
Figure 8:
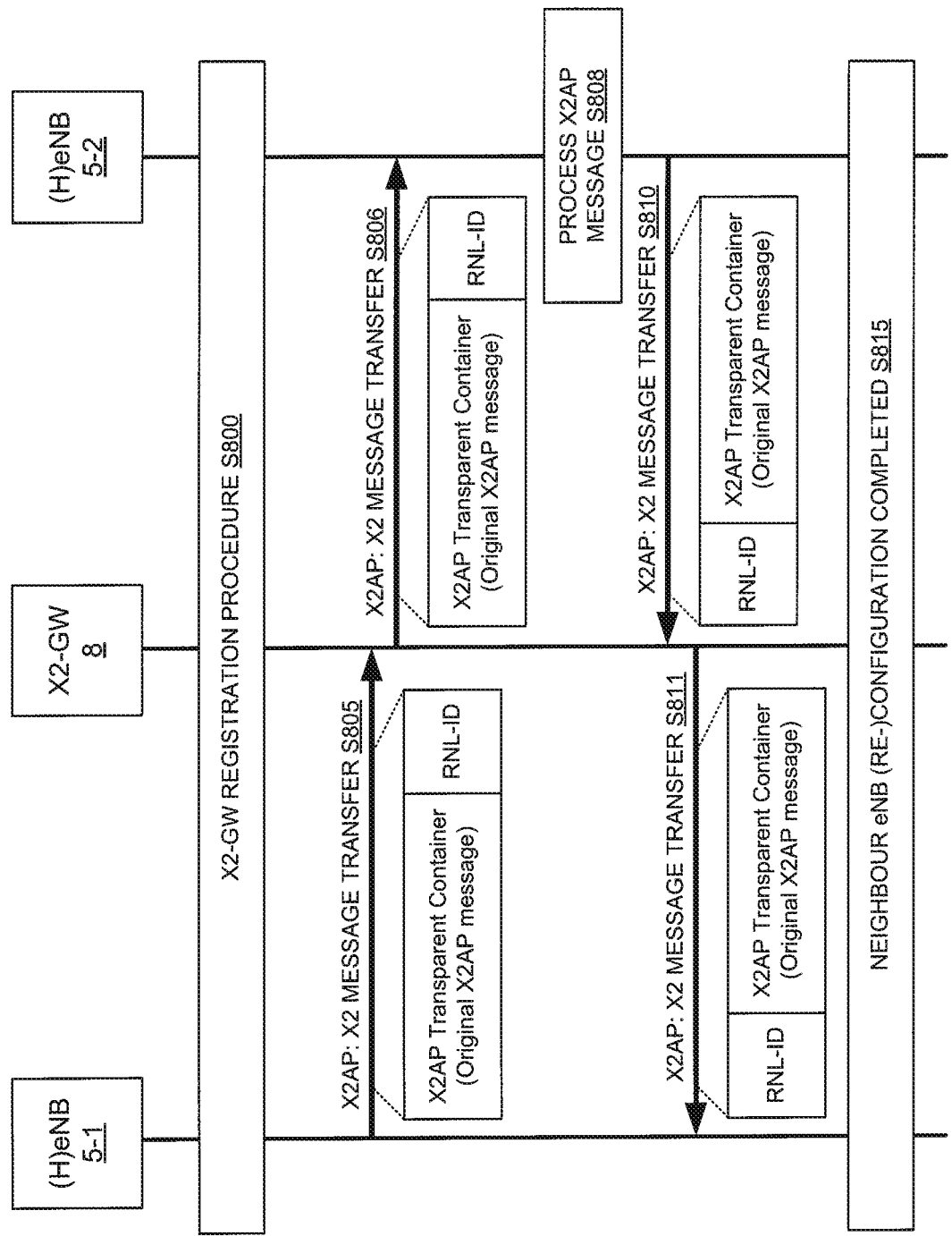
FIG. 8 is an exemplary timing diagram illustrating yet another method performed by components of the mobile telecommunication system of FIG. 1 whilst carrying out an exemplary embodiment of the invention.

Whilst for sake of simplicity the base station illustrated in FIG. 2 is capable of implementing each of the examples shown in FIGS. 4, 6, and 8, it will be appreciated that a base station that implements only some of the described examples does not necessarily include all modules. For example, the XAP module 67 is required for implementing the example described with reference to FIG. 5.

The communication control module 63 controls communications between the base station 5 and the mobile communication device 3, between the base station 5 and the network devices such as the MME 9, S-GW 11, and between the base station 5 and other base stations via the X2-GW 8.

The X2AP module 65 handles X2 signalling (e.g. generates, sends, and receives messages/PDUs formatted in accordance with the X2 application protocol) between the base station 5 and other (target) base stations via the X2-GW 8.

The XAP module 67 handles XAP signalling (e.g. generates, sends, and receives messages over the XAP sublayer) between the base station 5 and corresponding XAP modules of other nodes, e.g. the X2-GW 8 and/or other base stations. The XAP module 67 obtains an X2 PDU (a PDU comprising one or more X2-AP messages) from the X2AP module 65 and adds an XAP header to the X2 PDU to form an XAP message. The XAP header includes the RNL-ID associated with the base station to which the X2 PDU is to be forwarded by the X2-GW 8 and/or a Source ID.

The coding module 69 encodes X2AP messages sent and decodes X2AP messages received by the base station 5, for example, using the ANS.1 coding technique.

X2 Gateway

Figure 3:
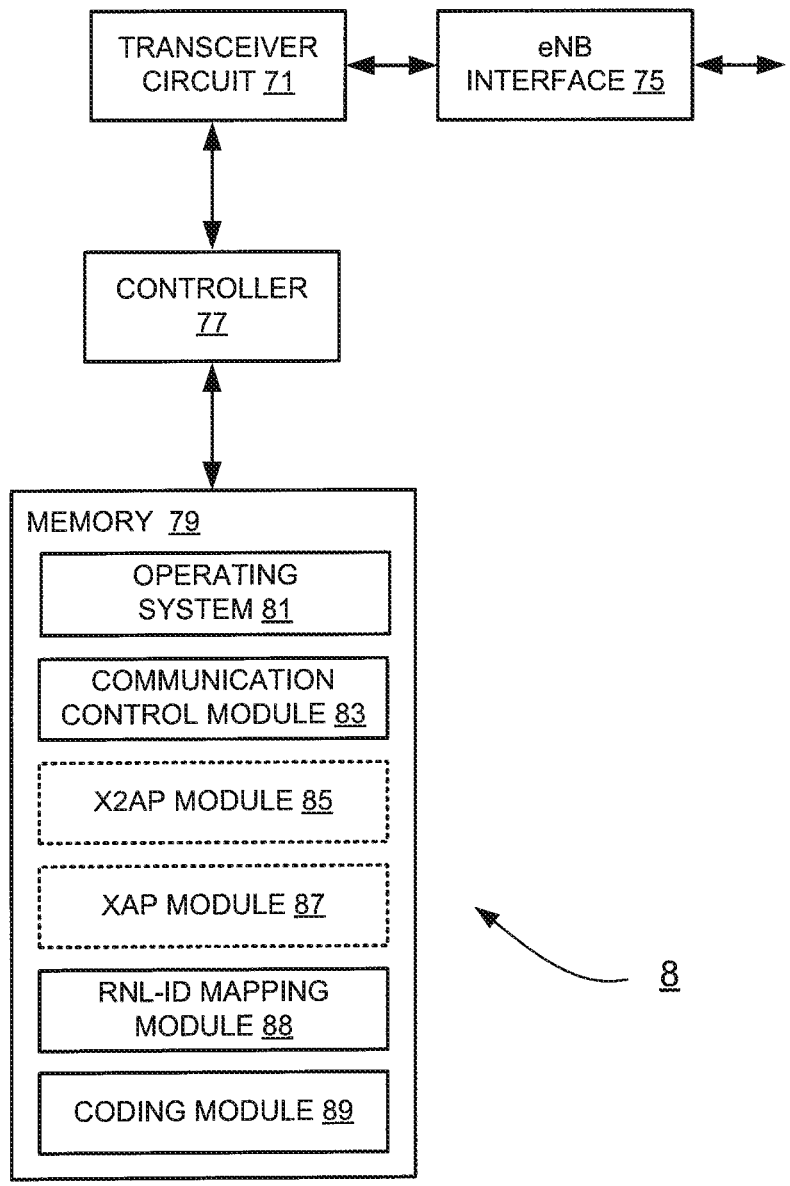
FIG. 3 is a block diagram illustrating the main components of a small cell X2 gateway forming part of the system shown in FIG. 1.

FIG. 3 is a block diagram illustrating the main components of the X2 gateway 8 shown in FIG. 1. As shown, the small cell gateway 8 includes transceiver circuit 71 which is operable to transmit signals to, and to receive signals from, base stations 5 via an eNB interface 75. The operation of the transceiver circuit 71 is controlled by a controller 77 in accordance with software stored in memory 79. The software includes, among other things, an operating system 81, a communication control module 83, an X2AP module 85, an XAP module 87, an RNL-ID mapping module 88, and a coding module 89.

Whilst for sake of simplicity the X2 gateway illustrated in FIG. 3 is capable of implementing each of the examples shown in FIGS. 4, 6, and 8, it will be appreciated that an X2 gateway 8 that implements only some of the described examples does not necessarily include all modules. For example, the XAP module 87 is required (whilst an X2AP module may not be required) for implementing the example described with reference to FIG. 5.

The communication control module 83 is operable to control communications between the X2 gateway 8 and the base stations 5 via the eNB interface 75.

The X2AP module 85 handles X2 signalling (e.g. generates, sends, and receives messages/PDUs formatted in accordance with the X2 application protocol) between the X2-GW 8 and the base stations 5. The X2AP module 85 retrieves the RNL-ID for a target base station from the X2AP messages/PDUs received from a sending base station, and uses the RNL-ID in its routing decision to forward the contents of the received X2AP messages/PDUs.

The XAP module 87 handles XAP signalling (e.g. generates, sends, and receives messages over the XAP sublayer) between the X2-GW 8 and the base stations 5. The XAP module 87 obtains any X2 PDUs (PDUs comprising one or more X2AP messages) from the received XAP signalling and passes them to the X2AP module 85. The XAP module 87 also retrieves any RNL-ID (associated with a base station to which the X2 PDU included in a particular XAP message is to be forwarded) from the XAP header of that message and makes an appropriate routing decision.

The RNL-ID mapping module 88 maintains a database (e.g. a list, table, or the like) of base stations served by the X2-GW 8 and their associated RNL-IDs and/or TNL addresses.

The coding module 89 encodes X2AP messages sent and decodes X2AP messages received by the X2-GW 8, for example, using the ANS.1 coding technique. If an RNL-ID is included in an X2AP message (from a base station), the coding module 89 decodes the part of the X2AP message containing the RNL-ID without decoding other parts of the X2AP message.

In the above description, the base station 5 and the small cell gateway 8 are each described for ease of understanding as having a number of discrete modules (such as the communication control modules, the X2AP modules, and the coding modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

First Embodiment

FIG. 4 is an exemplary timing diagram illustrating a method performed by components of the mobile telecommunication system 1 of FIG. 1 whilst carrying out an exemplary embodiment of the invention.

Initially, as shown respectively in steps S401 and S402, the base stations 5-1 and 5-2 each register with the X2-GW 8 so that the X2-GW 8 is aware of the current operating state of these base stations. For simplicity, the registration procedure is illustrated as a single step, although it will be appreciated that it may require the exchange of a plurality of messages (e.g. a registration request by the base station 5 and a corresponding approval/acknowledgement/failure by the X2-GW 8).

As can be seen, as part of the registration procedure, the first and the second base stations 5 inform the X2-GW 8 (e.g. by sending a suitable signalling message) about their respective RNL-IDs (denoted 'eNB ID1' and 'eNB ID2', respectively) using which X2 signalling can be routed to these base stations. The X2-GW 8 then obtains an associated TNL address (e.g. an IP address) for each SCTP association it maintains with the base stations.

In step S403, the X2-GW 8 (using its RNL-ID mapping module 88) updates its RNL-ID database with any received RNL-ID and mapping the RNL-ID to a TNL address for each registered base station 5 so that any subsequent X2AP messages/PDUs can be forwarded to the appropriate base station indicated by the RNL-ID included in (or associated with) that X2AP message/PDU.

Next, e.g. upon discovering its neighbour base station 5-2, the source base station 5-1 generates (using its X2AP module 65), encodes (using its coding module 69), and sends, at step S405, an appropriately formatted signalling message (e.g. an 'X2AP message transfer' signalling message) to the X2-GW 8, for forwarding the message to the neighbour (target) base station 5-2. In this example, the X2AP module 65 includes in the generated X2AP message data corresponding to an actual X2AP message (e.g. an 'X2 setup request' message) to be received by the target base station 5-2, and an information element (e.g. 'IE1' discussed above) that includes an RNL-ID (e.g. 'eNB ID2') of the target base station 5-2. The source base station 5-1 may also include its own RNL-ID, e.g. as a 'source ID' in 'IE1' or in another suitable information element. However, the X2AP module 65 arranges the generated X2AP message such that the part of the message that includes the RNL-ID of the target base station 5-2 appears as the first information element (or one of the first information elements). The coding module 69 encodes the message such that the part of the message containing the RNL-ID of the target base station 5-2 can be decoded first, and possibly without decoding the other parts of the message (e.g. the part(s) to be received by the target base station 5-2). Although the existing ASN. 1 coding may be used to encode the entire message, contrary to a conventional X2AP message structuring, the 'IE1' information element is added at the start (or near the start) of the X2AP message in this example.

Upon receipt of the message at S405, the X2-GW 8 starts by decoding (using its coding module 89) the part of the message that includes the RNL-ID of the target, then the X2-GW 8 (using its RNL-ID mapping module 88) looks up the corresponding base station 5-2, and forwards the received message, at step S406, to the base station 5-2 identified by the RNL-ID along the correct SCTP association.

Upon receipt of the X2AP message via the X2-GW 8, the coding module 69 of the target base station 5-2 decodes the contents that were coded using the ANS.1 coding technique and retrieves the parts of the X2AP message addressed to the target base station 5-2. The decoded contents are then passed to the X2AP module 65, which acts upon the received message as required (as generally illustrated at step S408).

In this example, the source base station 5-2 generates (using its X2AP module 65), encodes (using its coding module 69), and sends back, at S410, an appropriately formatted signalling message (e.g. an 'X2AP message transfer' signalling message) to the X2-GW 8, for forwarding the message to the base station 5-1 (which is now the target for this message). The X2AP module 65 includes in the generated X2AP message data corresponding to an actual X2AP message (e.g. an 'X2 setup response' message) to be received by the target base station 5-1 in response to its earlier X2AP message. The target base station 5-1 is identified by its RNL-ID (e.g. eNB ID1). The X2AP module 65 arranges the generated X2AP message such that the part of the message that includes the RNL-ID of the target base station 5-1 appears first. The coding module 69 encodes the message such that the part of the message containing the RNL-ID can be decoded first and/or without decoding the other parts of the message.

Upon receipt of the message at S410, the X2-GW 8 (using its coding module 89) initially decodes the part of the message that includes the RNL-ID, looks up the corresponding target base station 5-1 (using its RNL-ID mapping module 88), and forwards the received message, at step S411, to the target base station 5-1 identified by the RNL-ID.

Upon receipt of the X2AP message at S411, the target base station 5-1 (using its coding module 69) decodes the contents that were coded using the ANS.1 coding technique and retrieves the parts of the X2AP message addressed to the target base station 5-1. The decoded contents are then passed to the X2AP module 65.

As generally illustrated at step S415, after the X2AP message transfer round (S405 to S411) has completed, the base stations 5-1 and 5-2 have up-to-date information about each other so that they can adjust their operation accordingly. For example, the base stations 5-1 and 5-2 are able to hand over UEs between them, as appropriate according to their current configuration, network load, and/or radio conditions. However, if the X2AP message transfer round (S405 to S411) indicated that one (or both) of the base stations is being disconnected from the network, the other base station can beneficially avoid handing over user equipment to such a disconnected base station at least until a subsequent update is received from that base station (e.g. by repeating steps S405 to S411).

Operation

Second Embodiment

FIG. 5 schematically illustrates an exemplary protocol stack for implementing an exemplary embodiment of the invention.

As can be seen, the base stations 5 each implements a standard protocol stack as specified by in the relevant 3GPP standards. The standard protocol stack, starting from the lowest layer, includes:
- a physical layer, which specifies physical and electrical characteristics of the network, and handles the transmission of information over a network medium (e.g. cable or radio link);
- a data link layer, which is responsible for addressing, i.e. labelling information for a particular destination location, and for encapsulation of higher-level messages into frames that are sent over the network at the physical layer;
- an Internet Protocol (IP) layer, which is responsible for communicating data formatted in accordance with the IP protocol, using the services provided by the data link layer;
- a Stream Control Transmission Protocol (SCTP) layer, which is responsible for creating and maintaining respective SCTP associations with neighbour base stations; and
- an X2AP layer, which is responsible for communicating signalling messages over the X2 interface to/from other base stations using the corresponding SCTP association between them.

The X2-GW 8 also implements the functionalities of the above protocol stack. However, in the example shown in FIG. 5, the X2AP layer is omitted for sake of simplicity.

Further, in this case, the protocol stacks implemented by the base stations 5 and the X2-GW 8 also include a so-called XAP sub-layer (shown as part of the X2AP layer) for communicating between the base stations 5 and the X2-GW 8 by way of appropriately formatted XAP signalling messages.

As shown in FIG. 5, there is a first SCTP association (denoted 'SCTP$_1$') between the first base station 5-1 and the X2-GW 8, and there is a second SCTP association (denoted 'SCTP$_2$') between the X2-GW 8 and the second base station 5-2. Accordingly, the first base station 5-1 can send an X2AP message for the second base station 5-2 via the X2-GW 8 using the corresponding first SCTP association, which message is then forwarded by the X2-GW 8 using the second SCTP association.

The XAP layer may be implemented, for example, in a similar manner as the so called Radio Network Subsystem Application Part (RNSAP) User Adaption (RNA) protocol implemented by some (home) base stations and gateways to support routing over the Iurh interface provided between them. 3GPP TS 25.471 V11.2.0, the contents of which are incorporated herein by reference, discloses further details of the RNA protocol.

FIG. 6 is an exemplary timing diagram illustrating another method performed by components of the mobile telecommunication system 1 of FIG. 1 whilst carrying out an exemplary embodiment of the invention. In this exemplary method, XAP signalling messages are being sent between the base stations 5 and the X2-GW 8, implementing the protocol stack illustrated in FIG. 5.

Initially, as shown respectively in steps S601 and S602, the base stations 5-1 and 5-2 (using their respective XAP modules 67) request the X2-GW 8 to set up corresponding XAP connections (which include the creation of corresponding SCTP associations between each base station 5-1/5-2 and the X2-GW 8). To this effect, the first base station 5-1 includes in the message it sends to the X2-GW 8 (at S601) its RNL-ID (denoted 'eNB ID1') using which subsequent X2 signalling can be routed to that base station 5-1. Similarly, the second base station 5-2 also includes in the message it sends to the X2-GW 8 (at S602) its RNL-ID (denoted 'eNB ID2') using which X2 signalling can be routed to that base station 5-2 as well.

If the first base station's 5-1 request can be accommodated by the X2-GW 8, it generates (using its XAP module 87) and sends, in step S603, an appropriately formatted XAP message (e.g. a 'XAP setup response' message) to the first base station 5-1. However, if the first base station's 5-1 request cannot be accommodated by the X2-GW 8, the X2-GW 8 sends a failure notification instead.

Similarly, if the second base station's 5-2 request can be accommodated by the X2-GW 8, it generates (using its XAP module 87) and sends, in step S604, an appropriately formatted XAP message (e.g. a 'XAP setup response' message) to the second base station 5-2. If the second base station's 5-2 request cannot be accommodated by the X2-GW 8, the X2-GW 8 sends a failure notification.

By successful completion of the request-response communication between the first base station 5-1 and the X2-GW 8, messages S601 and S603, a first SCTP association (corresponding to 'SCTP$_1$' of FIG. 5) is created between them. Similarly, by successful completion of the request-response communication between the second base station 5-2 and the X2-GW 8, i.e. messages S602 and S604, a second SCTP association (corresponding to 'SCTP$_2$' of FIG. 5) is created. Accordingly, it is now possible to exchange X2 signalling between the first and second base stations 5-1 and 5-2 via the X2-GW 8 using the first and second SCTP associations in place.

Next, the first base station 5-1 generates (using its XAP module 67) and sends, at step S605, an appropriately formatted signalling message (e.g. an 'XAP message transfer' signalling message) to the X2-GW 8, for forwarding the contents of the message to the neighbour (target) base station 5-2. In this example, the XAP module 67 identifies the target base station 5-2 by including the target base station's 5-2 RNL-ID (e.g. 'eNB ID2') in the XAP header. The XAP module 67 also includes in this message a service data unit (SDU), which includes one or more X2AP messages (e.g. a 'X2 setup request' and/or any further X2AP signalling) to be forwarded to the neighbour base station 5-2 identified in the XAP header. The XAP header may also include an appropriate source ID (e.g. 'eNB ID'). The rest of a XAP message other than the XAP header can be encoded e.g. as a transparent container.

Upon receipt of the XAP message at S605, the X2-GW 8 (using its XAP module 87) retrieves the RNL-ID of the target from the XAP header portion, looks up the corresponding target base station 5-2 (using its RNL-ID mapping module 88), and forwards the XAP message (e.g. a corresponding XAP PDU or at least a corresponding XAP SDU), at step S606, to the base station 5-2 identified by the RNL-ID.

As generally illustrated at step S608, upon receipt of the XAP message from the X2-GW 8, the target base station 5-2 (using its XAP module 67) retrieves the X2 SDU from the XAP message passes the X2 SDU to the X2AP module 65, which acts upon the X2 SDU as appropriate—depending on the information included in the X2 SDU. Additionally, the X2AP module 67 may also obtain the 'source ID' from the XAP header, if appropriate.

In this example, the base station 5-2 generates (using its XAP module 67) and sends back, at S610, an appropriately formatted signalling message (e.g. an 'XAP message transfer' signalling message) to the X2-GW 8, for forwarding the contents of the message to the base station 5-1 (which is now the target for the message at S601). In this example, the XAP module 67 identifies the (target) base station 5-1 by including the target base station's 5-1 RNL-ID (e.g. 'eNB ID1') in the XAP header of this message. The XAP module 67 also includes in this message a service data unit (SDU), which includes one or more X2AP messages (e.g. a 'X2 setup response' and/or any further X2AP signalling) to be forwarded to the base station 5-1 identified in the XAP header. The XAP header may also include contain an identifier of the source base station 5-2 in the form of a Source ID (e.g. 'eNB ID2'). The rest of a XAP message other than the XAP header may be encoded e.g. as a transparent container.

Upon receipt of the XAP message at S610, the X2-GW 8 (using its XAP module 87) retrieves the RNL-ID of the target from the XAP header portion, looks up the corresponding target base station 5-1 (using its RNL-ID mapping module 88), and forwards the XAP message, at step S611, to the base station 5-1 identified by the RNL-ID.

Upon receipt of the XAP message from the X2-GW 8, the base station 5-1 (using its XAP module 67) retrieves the X2 SDU from the XAP message, passes the X2 SDU to the X2AP module 65, which acts upon the X2 SDU as indicated by the information included in the X2 SDU. If appropriate, the X2AP module 65 may also receive (from the XAP module 67) the 'Source ID' included in the XAP header.

Finally, as generally illustrated at step S615, after the XAP message transfer round (S605 to S611) has completed, the first and second base stations 5-1 and 5-2 have up-to-date information about each other so that they can adjust their subsequent operation accordingly. For example, the first and second base stations 5-1 and 5-2 are able to hand over user equipment between them, if permitted according to their current configuration. However, if the XAP message transfer round (S605 to S611) indicated that one (or both) of the base stations is being disconnected from the network, the other base station can beneficially avoid handing over user equipment to such disconnected base station at least until a subsequent update is received from that base station (e.g. by repeating steps S605 to S611).

Operation

Third Embodiment

Figure 7:
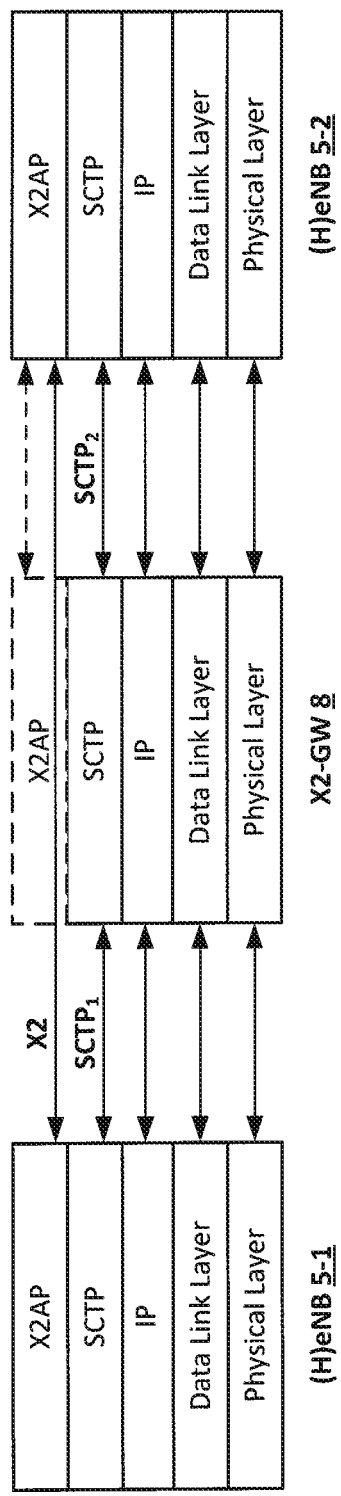
FIG. 7 schematically illustrates another exemplary protocol stack for implementing an exemplary embodiment of the invention.

FIG. 7 schematically illustrates another exemplary protocol stack for implementing an exemplary embodiment of the invention.

As can be seen, the base stations 5 and the X2-GW 8 each implements the standard protocol stack as described above with reference to FIG. 5 (i.e. a physical layer, a data link layer, an IP layer, an SCTP layer, and an X2AP layer (although the X2AP layer is optional in case of the gateway of this example).

As also shown in FIG. 7, there is a first SCTP association (denoted 'SCTP$_1$') between the first base station 5-1 and the X2-GW 8 for communicating X2AP messages between them, and there is a second SCTP association (denoted 'SCTP$_2$') between the X2-GW 8 and the second base station 5-2 for communicating X2AP messages between them. Accordingly, the first base station 5-1 can communicate X2 PDU(s) to the second base station 5-2 by sending a first X2AP message to the X2-GW 8 using the corresponding first SCTP association. The PDU(s) included in the first X2AP message is/are forwarded by the X2-GW 8 using the second SCTP association.

FIG. 8 is an exemplary timing diagram illustrating yet another method performed by components of the mobile telecommunication system 1 of FIG. 1 whilst carrying out an exemplary embodiment of the invention. This example is based on the protocol stack illustrated in FIG. 7.

Initially, as generally shown in step S800, the base stations 5-1 and 5-2 register themselves with the X2-GW 8, the details of which are omitted for simplicity. For example, the base stations may register with the X2-GW 8 by following one of the procedures described in the Applicant's (unpublished) patent application no. GB 1306203.9 (GB2512656A), a copy of which is included in Annex 1 below.

Next, the source base station 5-1 generates (using its X2AP module 65) and sends, at step S805, an appropriately formatted signalling message to the X2-GW 8, which message includes a transparent container for the neighbour (target) base station 5-2. The transparent container includes an X2AP message/PDU (e.g. a 'X2 setup request' and/or other X2AP signalling message) to be forwarded to the neighbour base station 5-2. In addition to the transparent container, the signalling message may also include an information element, e.g. 'IE1' that contains the RNL-ID of the target. The signalling message may also include a source ID. However, unlike in the example describe with reference to FIG. 4, in this example the information element 'IE1' may also be added to the end (or near to the end) of the X2AP message. In this example, the X2AP module 65 identifies the target base station 5-2 by including the target base station's 5-2 RNL-ID (e.g. eNB ID2) in a part of the X2AP message other than the transparent container.

Upon receipt of the X2AP message at S805, the X2-GW 8 (using its X2AP module 85) retrieves the RNL-ID of the target from the message, looks up the corresponding target base station 5-2 (using its RNL-ID mapping module 88), and forwards the contents of the transparent container, at step S806, to the base station 5-2 identified by the RNL-ID without decoding the transparent container.

As generally illustrated at step S808, upon receipt of the X2AP message from the X2-GW 8, the target base station 5-2 (using its X2AP module 65) retrieves the X2AP message/PDU from the transparent container and acts upon the X2AP message/PDU as appropriate—depending on the information included therein.

In this example, the base station 5-2 generates (using its X2AP module 65) and sends back, at S810, an appropriately formatted signalling message to the X2-GW 8, which message includes a transparent container for the base station 5-1 (which is the target for this message). The transparent container includes an X2AP message/PDU (e.g. a 'X2 setup response' and/or other X2AP signalling message) to be forwarded to the base station 5-1. In this example, the X2AP module 65 identifies the target base station 5-1 by including the base station's 5-1 RNL-ID (e.g. 'eNB ID1') in a part of the X2AP message other than the transparent container.

Upon receipt of the X2AP message at S810, the X2-GW 8 (using its X2AP module 85) retrieves the RNL-ID of the target from the message, looks up the corresponding target base station 5-1 (using its RNL-ID mapping module 88), and forwards the contents of the transparent container, at step S811, to the base station 5-1 identified by the RNL-ID of the target.

Upon receipt of the X2AP message from the X2-GW 8, the base station 5-1 (using its X2AP module 65) retrieves the X2AP message/PDU from the transparent container and acts upon the X2AP message/PDU as appropriate—depending on the information included therein.

Finally, as generally illustrated at step S815, after the X2AP message transfer round (S805 to S811) has completed, the first and second base stations 5-1 and 5-2 have up-to-date information about each other so that they can adjust their subsequent operation accordingly. For example, the first and second base stations 5-1 and 5-2 are able to hand over user equipment between them, if permitted according to their current configuration. However, if the X2AP message transfer round (S805 to S811) indicated that one (or both) of the base stations is being disconnected from the network, the other base station can beneficially avoid handing over user equipment to such disconnected base station at least until a subsequent update is received from that base station (e.g. by repeating steps S805 to S811).

MODIFICATIONS AND ALTERNATIVES

A number of detailed embodiments have been described above. As those skilled in the art will appreciate, a number of modifications and alternatives can be made to the above embodiments whilst still benefiting from the inventions embodied therein.

In the above description of FIG. 1, each base station is described to be a (home) base station operating a small cell (e.g. a pico/femto cell). However, it will also be appreciated that the signalling techniques described in the present application can be employed between any types of base stations, including regular/macro base stations, connected to each other via an X2 gateway.

In the above exemplary embodiments, the gateway is described to be an X2 gateway for facilitating communications between neighbouring base stations over the X2 interface. However, it will be appreciated that the gateway may also implement the so-called home evolved nodeB gateway or 'HeNB-GW' functionality to provide connectivity from the base station (such as an LPN/small cell base station) to the core network. It will also be appreciated that the X2 gateway may also be referred to as a small cell gateway.

In the above description of the first example, the X2AP message is encoded by the sending base station incorporating the target's RNL-ID in such a way that the X2-GW is not required to decode the entire X2AP message in order to be able to take an appropriate routing action/decision. It will be appreciated that, the source base station may advantageously encode the RNL-ID (or an appropriate IE carrying the RNL-ID) using a separate coding technique that the coding technique applied to the rest of the message. It will be appreciated that a variant of the ASN. 1 coding technique (or any other suitable coding technique) may be adapted for coding an RNL-ID and/or adapted for use with an X2 gateway in this manner. It will also be appreciated that the source base station can prepend (or append, if appropriate) a separately encoded RNL-ID (or an IE carrying the RNL-ID) to the X2AP message so that the receiving (forwarding) X2-GW does not need to process the entire X2AP message, only the part containing the RNL-ID. In some cases, e.g. depending on implementation and/or applicable network policies, the RNL-ID may be added to the X2AP message without any encoding.

Further, it will be appreciated that an RNL-ID may be included anywhere in an X2AP message from where it can be decoded before the other, target specific, information carried by the message (e.g. an SDU/PDU/transparent container) needs to be decoded. The X2-GW may be configured to decode the part of the X2AP message carrying the RNL-ID before decoding other parts of the message.

In the above description of FIG. 5, the X2AP messages are described to be encapsulated using the so-called 'XAP sub-layer'. However, it will be appreciated that the functionalities of the XAP sub-layer may be implemented by a separate layer (from the X2AP layer), e.g. an 'XAP layer' above the X2AP layer. The functionalities of the XAP sub-layer may also be implemented by an appropriately modified X2AP layer, e.g. an X2AP' layer having the functionalities of both the X2AP layer and an XAP (sub-) layer. Accordingly, the X2AP layer and XAP sub-layer may be implemented either as separate layers or as a single layer.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the exemplary embodiments described above, the base station and the gateway each include transceiver circuitry. Typically this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or to the gateway as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

This application is based upon and claims the benefit of priority from United Kingdom patent application No. 1317221.8, filed on Sep. 27, 2013, the disclosure of which is incorporated herein in its entirety by reference.

What is claimed is:

1. A method for a X2 Gateway (GW), the method comprising:
   receiving a X2 application protocol (AP) message transfer message configured in accordance with a X2 AP;
   (a) in a case where the X2 AP message transfer message includes identification information of a source base station and does not include a X2 AP message and identification information of a target base station, storing association information corresponding to a mapping of the identification information of the source base station and at least one Transport Network Layer (TNL) address of the source base station; and
   (b) in a case where the X2 AP message transfer message includes the X2 AP message, the identification information of the source base station and the identification information of the target base station, routing the X2AP message transfer message to the target base station, using the identification information of the target base station.

2. A X2 Gateway (GW), comprising:
   a memory storing instructions; and
   at least one processor configured to process the instructions to:
   receive a X2 application protocol (AP) message transfer message configured in accordance with a X2 AP;
   (a) in a case where the X2 AP message transfer message includes identification information of a source base station and does not include a X2 AP message and identification information of a target base station, store association information corresponding to a mapping of the identification information of the source base station and at least one Transport Network Layer (TNL) address of the source base station; and
   (b) in a case where the X2 AP message transfer message includes the X2 AP message, the identification information of the source base station and the identification information of the target base station, route the X2AP message transfer message to the target base station, using the identification information of the target base station.

3. A method for a base station, the method comprising:
   sending, to a X2 gateway (GW), a X2 application protocol (AP) message transfer message configured in accordance with a X2 AP;
   (a) in a case where the X2 AP message transfer message includes identification information of a source base station and does not include a X2 AP message and identification information of a target base station, causing the X2 GW to store association information corresponding to a mapping of the identification information of the source base station and at least one Transport Network Layer (TNL) address of the source base station; and
   (b) in a case where the X2 AP message transfer message includes the X2 AP message, the identification information of the source base station and the identification information of the target base station, causing the X2 GW to route the X2AP message transfer message to the target base station, using the identification information of the target base station.

4. A base station, comprising:
   a memory storing instructions; and
   at least one processor configured to process the instructions to:
   send, to a X2 gateway (GW), a X2 application protocol (AP) message transfer message configured in accordance with a X2 AP;
   (a) in a case where the X2 AP message transfer message includes identification information of a source base station and does not include a X2 AP message and identification information of a target base station, cause the X2 GW to store association information corresponding to a mapping of the identification information of the source base station and at least one Transport Network Layer (TNL) address of the source base station; and
   (b) in a case where the X2 AP message transfer message includes the X2 AP message, the identification information of the source base station and the identification information of the target base station, cause the X2 GW to route the X2AP message transfer message to the target base station, using the identification information of the target base station.

* * * * *